May 17, 1966 P. B. POST 3,252,006
DISTRIBUTED FUNCTION GENERATOR
Filed Aug. 14, 1963 2 Sheets-Sheet 1

INVENTOR.
PAUL B. POST
BY
Shenier & O'Connor
ATTORNEYS

May 17, 1966 P. B. POST 3,252,006

DISTRIBUTED FUNCTION GENERATOR

Filed Aug. 14, 1963 2 Sheets-Sheet 2

INVENTOR.
PAUL B. POST
BY
Shenier & O'Connor
ATTORNEYS

United States Patent Office 3,252,006
Patented May 17, 1966

3,252,006

DISTRIBUTED FUNCTION GENERATOR

Paul B. Post, South Norwalk, Conn., assignor to United Aircraft Corporation, East Hartford, Conn., a corporation of Delaware Filed Aug. 14, 1963, Ser. No. 302,089
9 Claims. (Cl. 307—88.5)

My invention relates to a distributed function generator and more particularly to an improved planar solid circuit distributed function generator which overcomes the defects of function generators of the prior art.

There are known in the prior art circuits which are employed to generate various desired functions. For example, one type of circuit known comprising a series of resistors connected to an input circuit by diodes to which various bias potentials are applied. As the input signal increases, the diodes cause current to be bled away at a rate which is some function of the input to generate the desired output. The most significant disadvantages of a network of this type is its limited accuracy. Owing to the fact that each individual diode acts as a switch, the input, output characteristic of the circuit is made up of a series of straight line segments joined at discrete breakpoints equal in number to the number of diodes. In order to achieve useful accuracy, the designer of a circuit of this nature must use a large number of diodes and resistors to approximate the desired characteristic. Moreover, the value of each resistor must be carefully calculated and is dependent upon the values of the other resistors. It will be apparent that this procedure requires that resistors be procured in special values which are not readily available.

Even after the above procedure has been followed to design a function generator of the type known in the prior art, the resultant network is very nearly useless wherein differentiation with time or other quantities is involved since the abrupt breakpoints can produce large errors in the derivative of the function. Consequently, function generators of this type are relatively limited in application and are not always suitable for use in missiles or the like wherein size and weight are of paramount importance. Moreover, even if such a system be produced, its reliability is seriously limited by the failure rates of its numerous parts.

I have invented a distributed function generator which overcomes the defects of function generators of the prior art. My generator is more accurate than are generators of the prior art. My generator permits generation of a continuous function having no breakpoints. Hence it permits accurate derviatives and finite differences to be generated with respect to time or other variables. It is much smaller and lighter than are circuit arrangements of the prior art for generating functions. It is highly reliable. My generator may be produced at less cost than can function generator circuits of the prior art. It has an extremely wide application.

One object of my invention is to provide a distributed function generator which overcomes the defects of function generators of the prior art.

Another object of my invention is to provide a distributed function generator which is more accurate than are function generators of the prior art.

A further object of my invention is to provide a distributed function generator which produces a smooth input, output characteristic.

Still another object of my invention is to provide a distributed function generator which is much smaller and lighter than are function generators of the prior art.

Yet another object of my invention is to provide a distributed function generator having a wide application.

A still further object of my invention is to provide a distributed function generator which is inexpensive to produce.

Still another object of my invention is to produce a function generator capable of being used in applications wherein differentiation with time or other quantities is involved.

Other and further objects of my invention will be apparent from the following description.

In general, my invention contemplates the provision of a distributed function generator including two masses of material of opposite conductivity type forming a junction at a relatively elongated interface. I pass a reference current through the material of one conductivity type to establish a potential distribution along the interface. I connect an input circuit to the other area adjacent an end thereof so that current is bled from the input circuit in accordance with the magnitude of the input voltage. By properly constructing the masses and arranging the electrodes and the like, I generate the desired function.

In the accompanying drawings which form part of the instant specification and which are to be read in conjunction therewith and in which like reference numerals are used to indicate like parts in the various views.

Figure 1:
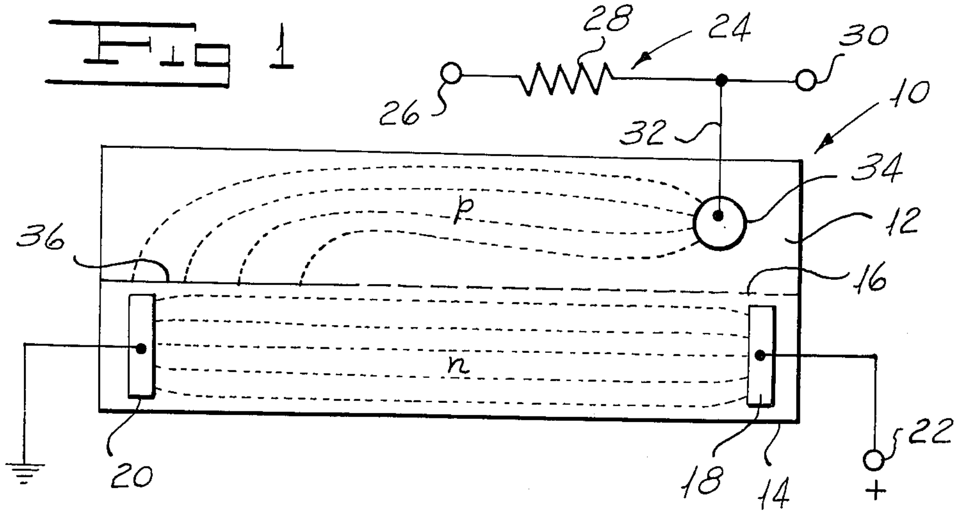
FIGURE 1 is a plan view of one form of my distributed function generator.
Figures 2, 3, 4:
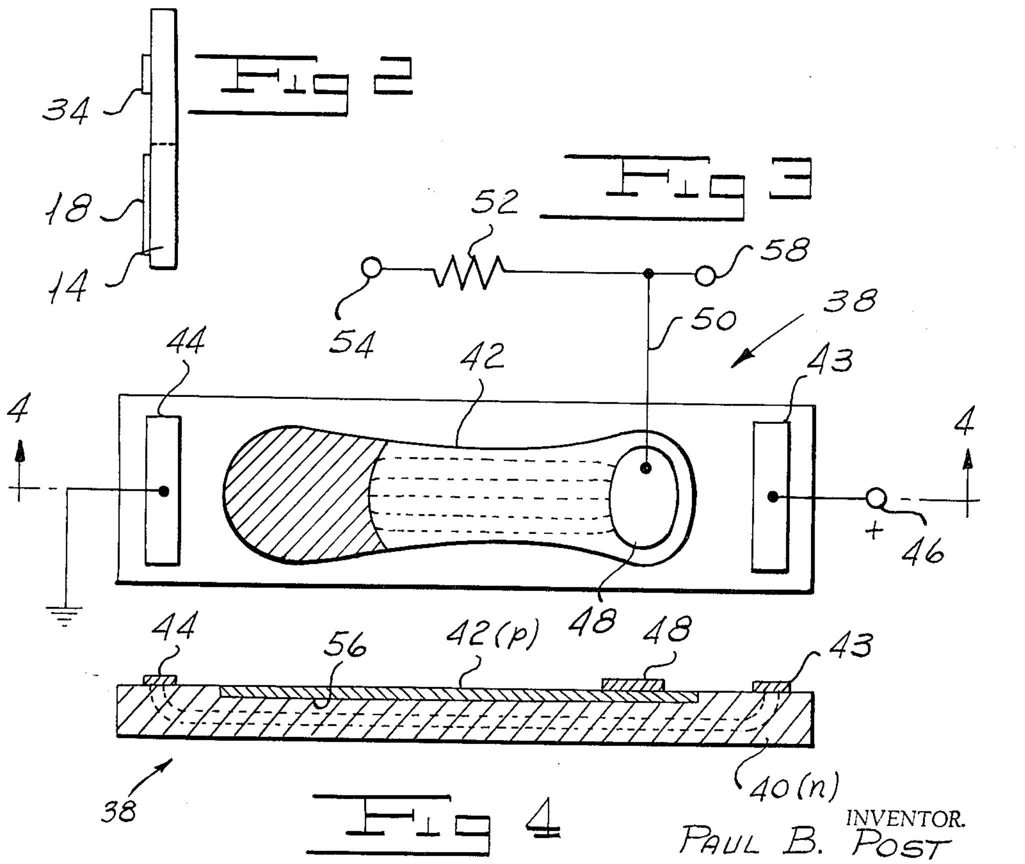
FIGURE 2 is an elevation of the form of my function generator shown in FIGURE 1.
FIGURE 3 is a plan view of a preferred embodiment of my distributed function generator.
FIGURE 4 is a sectional view of the form of my distributed function generator shown in FIGURE 3 taken along the line 4—4 of FIGURE 3.

Referring now to FIGURES 1 and 2 of the drawings, one form of my distributed function generator, indicated generally by the reference character 10, comprises two thin slabs 12 and 14 of oppositely doped semiconductor material separated by a long junction region indicated by the broken line 16. By way of example, the slab 12 may be p-type conductivity material while the slab 14 may be n-type conductivity material.

I provide the slab 14 with respective areas 18 and 20 of conductive material by means of which a reference potential may be applied to this slab. In the particular form of my generator shown in FIGURES 1 and 2, I apply a positive bias potential to a terminal 22 connected to the area 18 and I connect the area 20 to ground. With this reference potential applied to the slab 14, a reference current, indicated by the dotted lines, flows through the slab 14 from area 18 to area 20. Owing to this current flow, a substantially uniform potential is set up just below the junction 16.

The form of my function generator shown in the drawings includes an input circuit, indicated generally by the reference character 24, comprising an input terminal 26, an input resistor 28 and an output terminal 30. It will be readily apparent to those skilled in the art that while I have shown the resistor 28 as being separate from the slabs 12 and 14, it might be manufactured by techniques known to the art as an integral part of the generator in a single slab. Conductor 32 connects resistor 28 to a contact area 34 of conductive material on the slab 12.

With the reference current flowing in the manner described above, I apply an input voltage to the terminal 26. As this input voltage rises above zero, a bleed current, indicated generally by the dotted lines in the slab 12, begins to flow from the electrode 34 through the slab 12 and across the junction 16 at all points where the magnitude of the input voltage with respect to the reference potential is such as results in a forward drop. For a particular relatively low value of input current, I have indicated the conductive portion of the junction 16 by a solid line 36. Now, if the magnitude of the input voltage increases, the right end of the line 36 as viewed in FIGURE 1 moves further to the right until in a limit condition, the junction 16 merely acts as a forwardly biased diode. It is to be noted that while the sheet of current being bled from the input circuit distorts the reference field below the junction somewhat, this effect is small and can readily be compensated for by the configuration selected.

My device is extremely flexible as regards the variety of functions it is able to generate. This fact follows from the large number of degrees of freedom which are inherent therein. For example, the positions of the electrodes as well as the area and shape of the input electrode 34 can be varied. A number of connected input electrodes might be employed. The resistivity of the materials may be varied. Both the area and shape of the outer boundaries as well as the curvature of the junction region can be changed. The material may be varied in thickness and various isolated high conductivity regions might be provided. The latter would alter the shape of the input-output characteristic in selected regions.

Referring now to FIGURES 3 and 4, I have shown a preferred embodiment of my distributed function generator indicated generally by the reference character 38. I prefer the configuration shown in these figures for the reason that the formation of a structure such as is shown in FIGURES 1 and 2 of a pair of thin butt-joined slabs is unusual and relatively difficult to produce. As will be apparent from the description hereinbelow, the form of my generator illustrated in FIGURES 3 and 4 is easier to fabricate and it eliminates process control problems involved in a junction such as the junction 16 having only one large dimension.

Generator 38 comprises a substrate 40 of material of n-type conductivity, for example, in which I diffuse an impurity to produce an area 42 of p-type material, which area 42 has a predetermined size and shape which will result in generation of the desired function.

Respective contact areas 43 and 44 of conductive material permit a positive potential from a terminal 46 to be applied to the substrate 40 to cause a current flow from area 43 to area 44, which latter area is connected to ground. An area 48 of conductive material at the end of diffused area 42 adjacent contact 43 permits a connection by means of a conductor 50 from an input resistor 52 to the area 42. When an input voltage is applied to terminal 54, current flows through the junction 56 over an area determined by the magnitude of the input voltage. An output signal appears at terminal 58. This output voltage has a function which is determined by the various parameters, with the exception of curvature of the junction region, discussed above.

One advantage of the preferred form of my distributed function generator shown in FIGURES 3 and 4 is the ease with which the shape of the area 42 can be determined by use of masking techniques known to the art.

Figure 5:
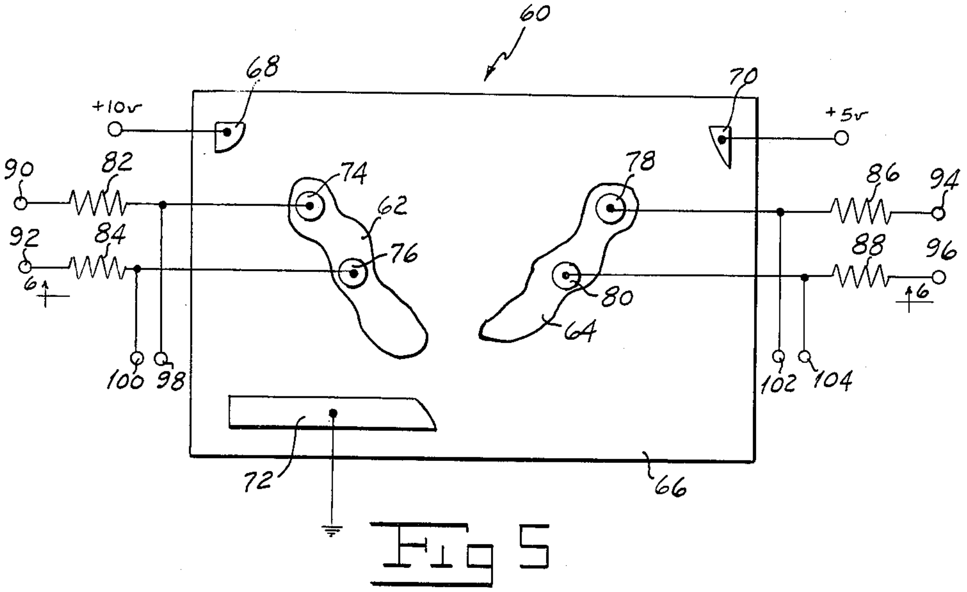
FIGURE 5 is a plan view of another form of my distributed function generator.
Figure 6:
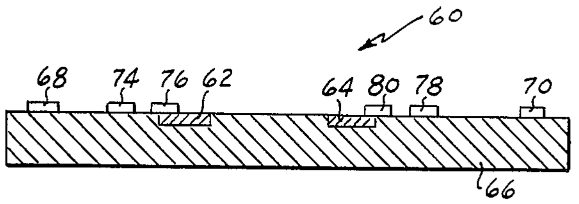
FIGURE 6 is a sectional view of the form of my function generator shown in FIGURE 5 taken along the line 6—6 of FIGURE 5.

Referring now to FIGURES 5 and 6, I have shown a form of my distributed function generator illustrating its versatility. In this form of my generator, indicated generally by the reference character 60, I diffuse respective areas 62 and 64 of one conductivity type such, for example, as p-type conductivity into a substrate 66 of material of the opposite conductivity type such, for example, as n-type conductivity. I provide the substrate 66 with ohmic contacts 68 and 70 at preselected locations thereon to permit the application of reference potentials to these points on the substrate. Another ohmic contact 72 permits a third reference potential to be applied to the substrate. By way of illustration only, I have shown a particular example in which I apply 10 volts reference potential to contact 68, 5 volts reference potential to contact 70 and connect the contact 72 to ground. From the foregoing description, it will readily be apparent that these connections produce a predetermined potential distribution in the substrate. I so arrange the diffused areas 62 and 64 that the lengths thereof run generally in a direction perpendicular to lines of equal potential in the substrate.

I provide area 62 with ohmic contacts 74 and 76 spaced along the length of the area. Similarly ohmic contacts 78 and 80 are spaced along the length of the area 64. It will be noted that I do not place any ohmic contact at the low potential end of either of the areas 62 and 64 since no useful result pursuant to my invention would be produced thereby.

Respective input resistors 82, 84, 86 and 88 connect input voltages at terminals 90, 92, 94 and 96 respectively to the ohmic contacts 74, 76, 78 and 80. With this arrangement a number of desired functions appear at output terminals 98, 100, 102 and 104. From the showing of FIGURES 5 and 6 it will be apparent that I may construct my distributed function generator with a plurality of diffused areas and with a plurality of ohmic contacts on each area to permit the generation of functions of two or more input variables. It will readily be understood that suitable electronic devices can be connected between any terminals to form a complete integrated circuit which could generate periodic or other non-monotonic functions of input variables.

In manufacturing the form of my generator shown in FIGURE 1, I join the two slabs 12 and 14 to form the junction 16. In manufacturing the form of my generator shown in FIGURES 3 and 4, I diffuse the desired area 42 into the substrate 40. In each case, as the input potential rises, more and more current is bled from the input circuit through the junction to combine with the reference current and flow to ground. By changing various characteristics of the generator, a very wide variety of functions can be produced. It will readily be apparent from the showing of FIGURES 5 and 6 that I may provide a plurality of diffused areas and I may also apply more than one input signal to a given area.

It will be seen that I have accomplished the objects of my invention. I have provided a function generator which is adapted to generate a continuous function. My generator is more accurate than are function generating circuits of the prior art. It has a wide range of application. It is simpler and less expensive than are function generators of the prior art. It is smaller and lighter than generators of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A function generator including in combination a first area of material of one of the conductivity types positive and negative, a second elongated area of material of the other conductivity type having two ends, the two areas being superposed to provide an elongated p-n junction, the ends of the second area overlying respective regions of the first area, means for applying to the material of the first area an electric field having a component along the general direction of elongation of the second area such that the regions have respective positive and negative relative polarities, means providing an ohmic contact with the second area remote that end overlying the region having a relative polarity which is opposite to the conductivity type of the second area, a source of variable input voltage, and means including a resistor for applying the source voltage to the contact.

2. A function generator including in combination a first area of material of one of the conductivity types positive and negative, a second elongated area of material of the other conductivity type having two ends, the two areas being superposed to provide an elongated p-n junction, the ends of the second area overlying respective regions of the first area, means for applying to the material of the first area an electric field having a component along the general direction of elongation of the second area such that the regions have respective positive and negative relative polarities, means providing an ohmic contact with the second area remote that end overlying the region having a relative polarity which is opposite to the conductivity type of the second area, a source of variable input voltage, said input voltage having such polarity as to forwardly bias at least a portion of the junction, and means including a resistor for applying the source voltage to the contact.

3. A function generator including in combination a first area of thin material of one of the conductivity types positive and negative, a second thin elongated area of the other conductivity type having two ends, said areas having abutting edges to provide an elongated junction between said areas, said ends of the second area overlying regions of the first area, means for applying to the material of the first area an electric field having a component along the general direction of the second area such that the regions have respective positive and negative relative polarities, means providing an ohmic contact with the second area remote that end overlying the region having a relative polarity which is opposite to the conductivity type of the second area, a source of variable input voltage, and means including a resistor for applying the source to the contact.

4. A function generator including in combination a first area of material of one of the conductivity types positive and negative, a second elongated area of material of the other conductivity type having two ends, the two areas being superposed to provide an elongated p-n junction, the ends of the second area overlying respective regions of the first area, means for applying to the material of the first area an electric field having a component along the general direction of elongation of the second area such that the regions have respective positive and negative relative polarities, means providing an ohmic contact with the second area remote that end overlying the region having a relative polarity which is opposite to the conductivity type of the second area, a source of variable input voltage, means for applying said source voltage to said contact to cause a current to flow through said junction for a distance along the length thereof determined by the magnitude of the source voltage relative to the distributed potential, and means for deriving an output signal as a function of said input voltage and said current.

5. A function generator including in combination a first area of material of one of the conductivity types positive and negative, a second elongated area of material of the other conductivity type having two ends, said elongated area having a nonlinear characteristic of resistance per unit length, said two areas being superposed to provide an elongated p-n junction, the ends of the second area overlying respective regions of the first area, means for applying to the material of the first area an electric field having a component along the general direction of elongation of the second area such that the regions have respective positive and negative polarities, means providing an ohmic contact with the second area remote that end overlying the region having a relative polarity which is opposite to the conductivity type of the second area, a source of variable input voltage, and means including a resistor for applying the source voltage to the contact.

6. A function generator including in combination a first area of material of one of the conductivity types positive and negative, a second elongated area of material of the other conductivity type having two ends, the two areas being superposed to provide an elongated p-n junction, the ends of the second area overlying respective regions of the first area, means for applying to the material of the first area an electric field having a component along the general direction of elongation of the second area such that said regions have respective positive and negative relative polarities, means providing a first ohmic contact with the second area remote that end overlying the region having a relative polarity which is opposite to the conductivity type of the second area, means providing a second ohmic contact with the second area at a point intermediate said end overlying the region having a relative polarity which is opposite to the conductivity type of the second area and said first area, a first voltage source, a second voltage source and respective means for coupling said voltage sources to said first and second ohmic contacts.

7. A function generator including in combination a first area of material of one of the conductivity types positive and negative, a second elongated area of material of the other conductivity type having two ends, a third elongated area of material of the other conductivity type having two ends, a third elongated area of material of the other conductivity type having two ends, said areas of said other conductivity type being in superposed relationship with said first area to provide a pair of elongated p-n- junctions, the ends of said second area overlying respective regions of the first area, the ends of said third area overlying respective regions of the first area, means for applying to the material of the first area an electric field having components along the general directions of elongation of the second and third areas such that the respective area regions have respective positive and negative relative polarities, means providing a first ohmic contact with the second area remote its end overlying the region having a relative polarity which is opposite to the conductivity type of the second area, means providing a second ohmic contact with the third area remote its end overlying the region having a relative polarity which is opposite to the conductivity type of the third area, a first voltage source, a second voltage source and means for coupling said sources respectively to said ohmic contacts.

8. A function generator including in combination a first area of material of one of the conductivity types positive and negative, a second elongated area of material of the other conductivity type having two ends, a third elongated area of material of the other conductivity type having two ends, said second and third areas being in superposed relationship with said first area to provide elongated p-n junctions, the ends of the second area overlying respective regions of the first area, the ends of the third area overlying respective regions of the first area, means for applying to the material of the first area an electric field having components along the general directions of elongation of the second and third areas such that the respective area regions have respective positive and negative relative polarities, means providing an ohmic contact with the second area remote that end overlying the region having a relative polarity which is opposite to the conductivity type of the second area, means providing a second ohmic contact with the second area intermediate that end overlying the region having a relative polarity which is opposite to the conductivity type of the second area and said first ohmic contact, means providing a third ohmic contact with the third area remote that area end overlying the region having a relative polarity which is opposite to the conductivity type of the second area, a first voltage source, a second voltage source, a third voltage source and means for coupling said sources respectively to said ohmic contacts.

9. A function generator including in combination a first area of n-type conductivity material, a second elongated area of p-type conductivity material having two ends, said areas being superposed to provide an elongated p-n junction, the ends of the second area overlying respective regions of the first area, means for applying to the material of the first area an electric field having a component along the general direction of elongation of the second area such that said regions have respective positive and negative relative polarities, means providing an ohmic contact with the second area remote that end overlying the region having said negative relative polarity, a source of variable input voltage, and means including a resistor for applying the source voltage to the contact.

References Cited by the Examiner

UNITED STATES PATENTS

| | | | |
|---|---|---|---|
| 2,907,934 | 10/1959 | Engel | 307—88.5 |
| 3,062,972 | 11/1962 | Spector et al. | 317—235 |
| 3,097,336 | 7/1963 | Sziklai et al. | 307—88.5 |

ARTHUR GAUSS, *Primary Examiner.*

JOHN W. HUCKERT, *Examiner.*

R. H. EPSTEIN, *Assistant Examiner.*